United States Patent [19]

Zhou et al.

[11] Patent Number: 5,502,865
[45] Date of Patent: Apr. 2, 1996

[54] WINDSHIELD WIPER SYSTEM HAVING A WIPER BLADE CAPABLE OF RETRACTION FOR HIDDEN PARK

[76] Inventors: Peter S. Zhou, 2067 Richfield Dr., #C, Dayton, Ohio 45420; Harry C. Buchanan, Jr., 1274 Timberwyck Ct., Spring Valley, Ohio 45370-9635; Michael J. McClain, 907 Cascade Dr., Dayton, Ohio 45431

[21] Appl. No.: 442,692

[22] Filed: May 17, 1995

[51] Int. Cl.⁶ .................................. B60S 1/36; B60S 1/40
[52] U.S. Cl. ..................... 15/250.16; 15/250.23
[58] Field of Search .............. 15/250.16, 250.21, 15/250.23, 250.351, 250.32, 250.20, 250.13

[56] References Cited

U.S. PATENT DOCUMENTS

| | | | |
|---|---|---|---|
| 3,247,540 | 4/1966 | Howard et al. | 15/250.23 |
| 4,641,390 | 2/1987 | Michalke | 15/250.23 |
| 4,707,641 | 11/1987 | Guerard et al. | 15/250.23 |
| 4,791,696 | 12/1988 | Durtnal | 15/250.23 |
| 5,119,523 | 6/1992 | Unterborn | 15/250.16 |
| 5,181,293 | 1/1993 | Baumgarten et al. | 15/250.21 |
| 5,301,383 | 4/1994 | Suzuki | 15/250.23 |

FOREIGN PATENT DOCUMENTS

3405677  8/1984  Germany ...................... 15/250.21

*Primary Examiner*—Gary K. Graham
*Attorney, Agent, or Firm*—Ratner & Prestia

[57] ABSTRACT

A windshield wiper system for automotive vehicles includes a power source and a driver for causing a wiper blade assembly to swing, relative to the wiper arm, between an extended position of the wiper blade assembly and a retracted position of the wiper blade assembly. The power source and driver, which are selectively connected to one another, cause a link, which is attached to the wiper blade assembly, to swing as the wiper arm moves into and out of the hidden park position. A first embodiment uses a pressure fluid source as the power source and a piston as the driver to cause pivotal movement of the link as the wiper blade assembly moves into and out of the hidden park position. A second embodiment uses an electrical source as the power source and an electrical motor as the driver to cause pivotal movement of the link as the wiper blade assembly moves into and out of the hidden park position.

11 Claims, 6 Drawing Sheets

WINDSHIELD WIPER SYSTEM HAVING A WIPER BLADE CAPABLE OF RETRACTION FOR HIDDEN PARK

FIELD OF THE INVENTION

This invention relates to windshield wiper arrangements for automotive vehicles having a wiper blade which is extended during operation relative to the wiper arm, as compared to the position of the wiper blade relative to the wiper arm while the wiper blade is in the "hidden park position." In this way, the amount of surface area of the windshield which is wiped (defined by the lower "inwipe" position, the upper "outwipe" position, and the distances from the wiper arm oscillation point to the innermost and outermost points of the wiper blade) is increased.

BACKGROUND OF THE INVENTION

As windshields become more and more sloped, a wiper which is long enough to wipe a sufficient area of the windshield to comply with Federal Motor Vehicle Safety Standards (FMVSS) might be so long that it would hit an obstruction if it were made to park at its normal wiping length. This design requirement is presently particularly troublesome for the passenger's side (i.e., right) windshield wiper of a pair of wipers that move back and forth in the familiar tandem pattern. In the future, this design requirement could also become a consideration in the design of a driver's side (i.e., left) windshield wiper or a rear window windshield wiper. The obstruction for a passenger's side windshield wiper is the side edge molding of the windshield itself or another vehicle body component, such as the hood hinge. In other words, there is only so much space available along the recess just below the lower windshield edge in which to park the wiper.

A wiper which is fabricated shorter in order to be accommodated in the available wiper parking space will not be in compliance with FMVSS. More specifically, such a wiper would be too short to wipe a sufficient area of the windshield to comply with FMVSS. Besides the problem of accommodating the wiper in the limited available space, other factors, such as the effect of freezing rain, snow, or debris, must be taken into consideration in the design of hidden park wiper arrangements. Thus, wiper mechanisms for enlarged windshields in the future will be arranged with arms which extend during operation and retract when being parked. To achieve both FMVSS compliance and provide hidden park, the wiper arm should be shortened by approximately 45 mm to 75 mm when going into the hidden park position and returned to an extended length during operation.

U.S. Pat. No. 5,119,523 discloses a linkage arrangement by which the wiper blade assembly is attached to the remote end of the wiper arm for pivotal movement to extend and retract the wiper blade assembly. In this system, the force of a spring acts on the linkage arrangement thereby causing the wiper blade to achieve its extended position during the normal wipe pattern. As the wiper blade is restored to its hidden park position, an external striker plate exerts a force on the linkage arrangement in a direction opposite to the direction of the force of the spring. In this way, the wiper blade assumes its retracted position.

SUMMARY OF THE INVENTION

The present invention relates to a windshield wiper system having a wiper post, a wiper arm having a first end mounted to the wiper post for oscillatory movement, a wiper blade assembly, and a link attached to the wiper blade assembly and to the wiper arm for pivotal movement relative to the wiper arm. The system also includes a known drive device, such as a wiper motor and a drive arm movable in response to the wiper motor and coupled to an end of the wiper post remote from the wiper arm, for imparting oscillatory movement to the wiper arm. The system further includes a power source, a driver responsive to the power source, and a sensor. These elements serve to impart relative pivotal movement between the link and the wiper arm in a first pivotal movement direction as the wiper arm passes through a predetermined position (i.e., corresponding to movement of the wiper blade into the hidden park position) in oscillatory movement of the wiper arm in a first oscillatory movement direction. Similarly, these elements serve to impart relative pivotal movement between the link and the wiper arm in a second pivotal movement direction, opposite to the first pivotal movement direction, as the wiper arm passes through the predetermined position in oscillatory movement of the wiper arm in a second oscillatory movement direction, opposite to the first oscillatory movement direction.

According to a first embodiment of the present invention, the pivotal movement of the link is achieved by using a pressure fluid source as the power source and a piston as the driver. The pressure fluid source and the piston are selectively connected to one another by a valve assembly disposed between the fluid source and the piston, a solenoid which actuates the valve assembly, and a control unit responsive to the sensor. In response to the control unit, the pressure fluid source delivers pressure fluid to the valve assembly. Also in response to the control unit, the solenoid actuates the valve assembly to control the fluid flow path between the valve assembly and the piston. Preferably, a stabilizer rod is pivotally connected to the wiper arm and the wiper blade assembly to move pivotally with the link.

According to a second embodiment of the present invention, the pivotal movement of the link is achieved by using an electrical source as the power source and an electrical motor as the driver. The electrical source and the electrical motor are selectively connected to one another by a control unit. The control unit responds to the sensor and is positioned between the electrical source and the motor to selectively open and close an electrical connection between the electrical source and the motor. The rotational movement of the motor is preferably translated to the pivotal movement of the link by a series of gears and drive rods. Preferably, a stabilizer rod is pivotally connected to the wiper arm and the wiper blade assembly to move pivotally with the link.

It is to be understood that both the foregoing general description and the following detailed description are exemplary, but not restrictive, of the invention.

BRIEF DESCRIPTION OF THE DRAWINGS

The invention is best understood from the following detailed description when read in connection with the accompanying drawings, in which.

DETAILED DESCRIPTION OF THE INVENTION

Figure 1:
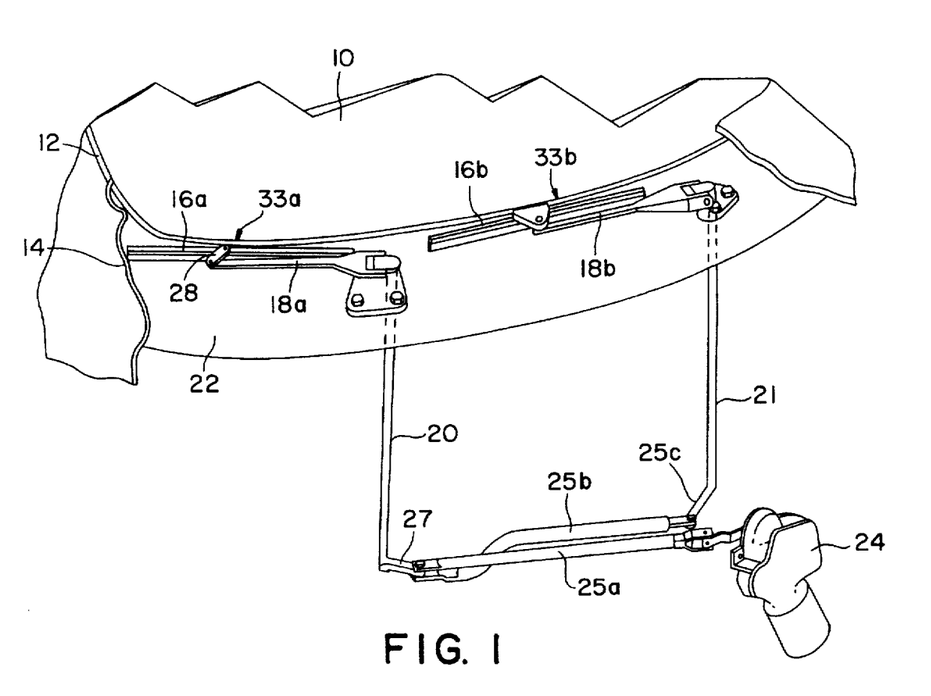
FIG. 1 is a perspective view of a portion of a vehicle body, a windshield, and a drive unit for windshield wipers, with which a wiper system in accordance with the present invention may be used.

FIG. 1 shows a portion of the vehicle body which is the environment for a wiper system in accordance with the present invention. More specifically, FIG. 1 shows a windshield 10, a portion of a vehicle body 12 and a side edge molding 14 of the windshield. Molding 14 confines wiper blade 16a, which is the wiper blade for the passenger's side of the automotive vehicle. Depending on the particular design of the vehicle, other components, such as a hood hinge, could be obstructions to wiper blade 16a. Wiper blade 16b is the wiper blade for the driver's side of the automotive vehicle. Wiper blade assemblies 33a and 33b, which include wiper blades 16a and 16b, are respectively mounted to wiper arms 18a and 18b. Wiper arm 18a is connected at one end to a wiper post 20, which may be tubular, and wiper arm 18b is connected at one end to a wiper post 21.

FIG. 1 also shows a conventional wiper drive system for imparting oscillatory movement to wiper arms 18a and 18b from a lower "inwipe" position to an upper "outwipe" position during normal wiping. Wiper posts 20, 21 extend downward below a sheet metal portion 22 of the automotive vehicle. A conventional drive device, such as a wiper motor 24, causes rotation of wiper post 20 through a drive bar 25a and a drive arm 27. Similarly, wiper motor 24 causes rotation of wiper post 21 through drive bars 25a, 25b, and 25c, which are pivotally connected to one another.

FIG. 1 does not show the components which cause wiper blade 16a to extend relative to wiper arm 18a as wiper blades 16a and 16b move out of the hidden park position. FIG. 1 does show wiper blades 16a and 16b in the hidden park position, which means a position in a recess below the lower windshield edge. This position is contrasted with the lower "inwipe" position which is the lower position wiper blades 16a and 16b oscillate to and from during normal wiping. The upper "outwipe" position is the upper position which wiper blades 16a and 16b oscillate to and from during normal wiping.

As shown in FIG. 1, a link 28 is attached to wiper blade 16a and to wiper arm 18a. Link 28 is adapted to permit pivotal movement relative to wiper arm 18a in a first direction and a second direction opposite to the first direction. The present invention serves to drive one end of link 28 to move wiper blade 16a between its retracted position, when in hidden park, and its extended position during normal wiping.

More specifically, as wiper arm 18a passes through a predetermined position while undergoing oscillatory movement in a first oscillatory movement direction (i.e., from the hidden park position to the inwipe position), the present invention imparts to link 28 relative pivotal movement between link 28 and wiper arm 18a in a first pivotal movement direction. Similarly, as wiper arm 18a passes through the predetermined position while undergoing oscillatory movement in a second oscillatory movement direction (i.e., from the inwipe position to the hidden park position), the present invention imparts to link 28 relative pivotal movement between link 28 and wiper arm 18a in a second pivotal movement direction, opposite to in the first pivotal movement direction. The "predetermined position" is an arc within the range of motion of the wiper arm, between the hidden park position and the inwipe position, over which it would be suitable to cause extension of or retraction of a wiper blade. The specific location of this arc would vary depending on the particular design of the automotive vehicle, such as the obstructions to the wiper blade, the desired length of extension of the wiper blade, and the angular distance between the hidden park position and the inwipe position.

As shown in FIGS. 2(a), 2(b), 3(a), 3(b), and 3(c), a first embodiment of the present invention achieves the pivotal movement of wiper blade 16a by using a pressure fluid source 30. Pressure fluid source 30 may be any known pressure fluid source in an automotive vehicle, such as the power steering fluid pump, the transmission fluid pump, or the windshield washer fluid pump. In fluid communication with pressure fluid source 30 is a valve assembly 31. In normal operation, pressure fluid from pressure fluid source 30 is conducted to a pressure fluid drain, such as a washer nozzle for a windshield washer fluid, via a bypass valve (not shown) or another pressure fluid conduit (not shown) extending from pressure fluid source 30.

Figure 2A:
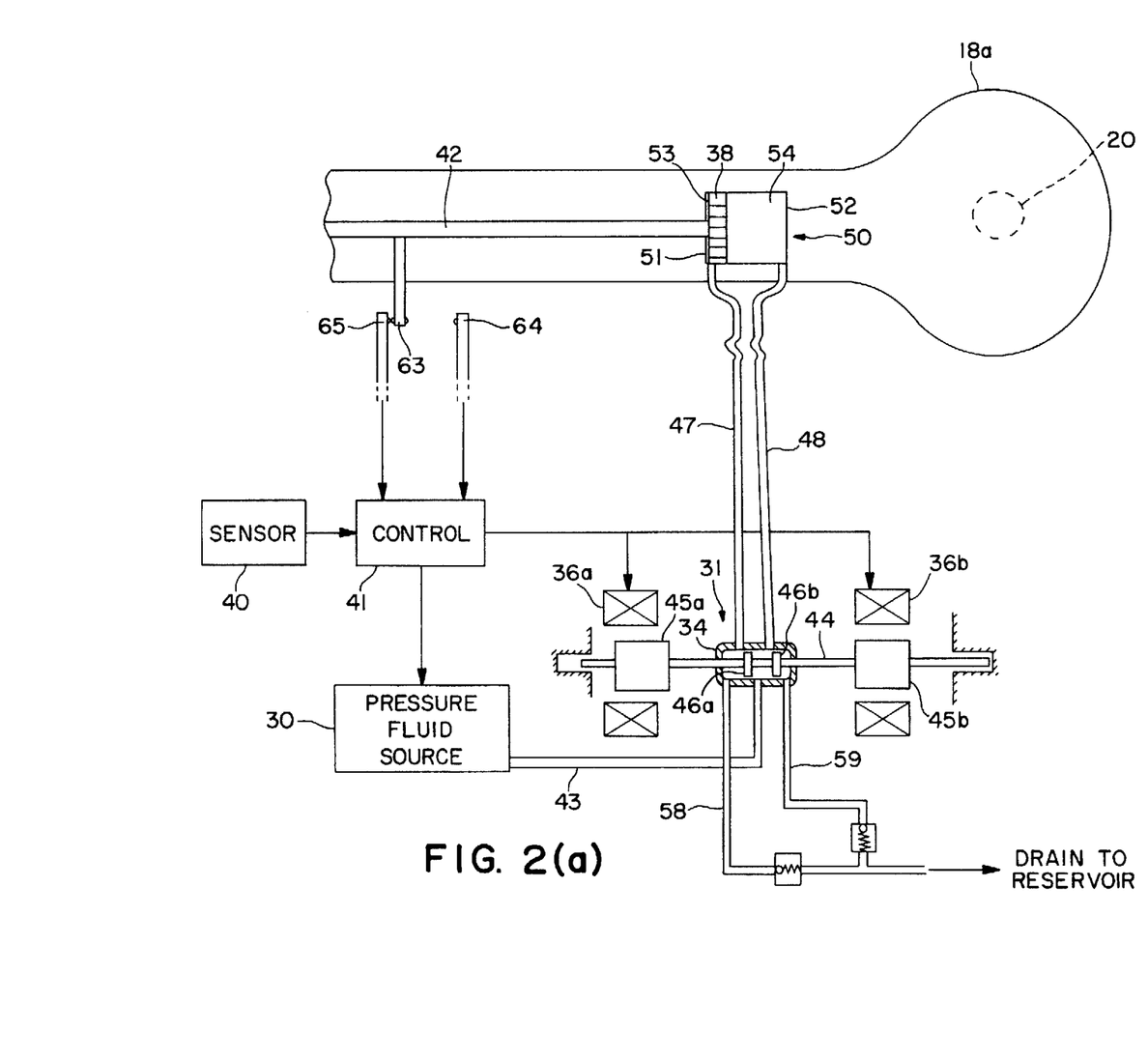
FIGS. 2(a) and 2(b) are schematic views showing a wiper system in accordance with a first embodiment of the present invention, with the wiper blade in its retracted and extended positions, respectively.
Figure 2B:
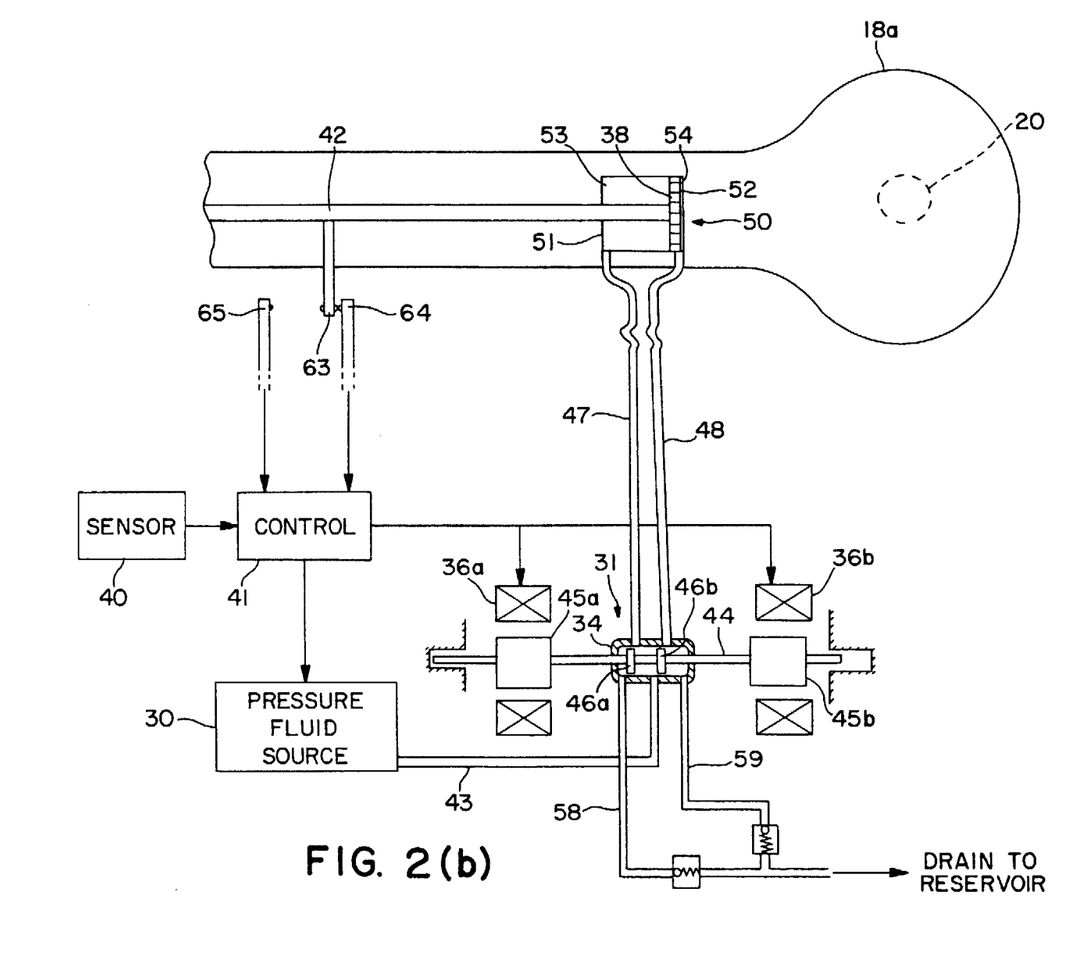

Valve assembly 31 is actuated by a solenoids 36a and 36b, which serve to control fluid flow between pressure fluid source 30 and a piston 38, which is used as the driver to drive link 28. Solenoids 36a and 36b are controlled by a control unit 41, which responds to a sensor 40. Sensor 40 may be any known sensor which can detect the position of wiper arm 18a, such as a magnetic sensor and/or a probe on the wiper arm. Alternatively, an electrical sensor may be used in the switch which turns wiper motor 24 on and off. Sensor 40 detects the position of wiper arm 18a and emits a signal to controller 41, which then actuates solenoid 36a whenever wiper arm 18a is being moved into the hidden park position and solenoid 36b whenever wiper arm 18a is being moved out of the hidden park position.

Figure 3A:
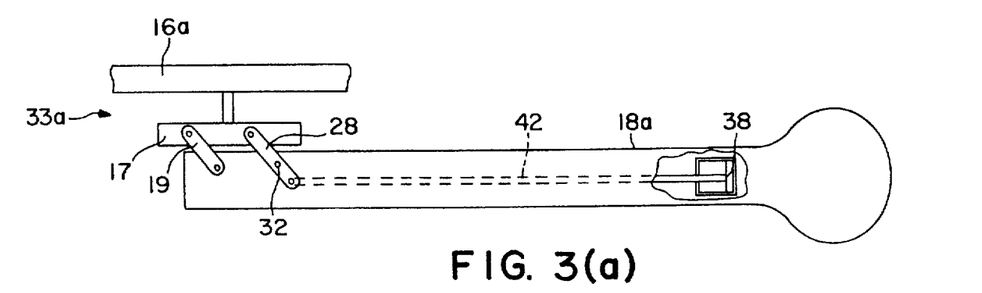
FIGS. 3(a), 3(b), and 3(c) are top plan views of a wiper arm and wiper blade in accordance with the embodiment shown in FIGS. 2(a) and 2(b), with the wiper blade in its extended, intermediate, and retracted positions, respectively.
Figure 3B:
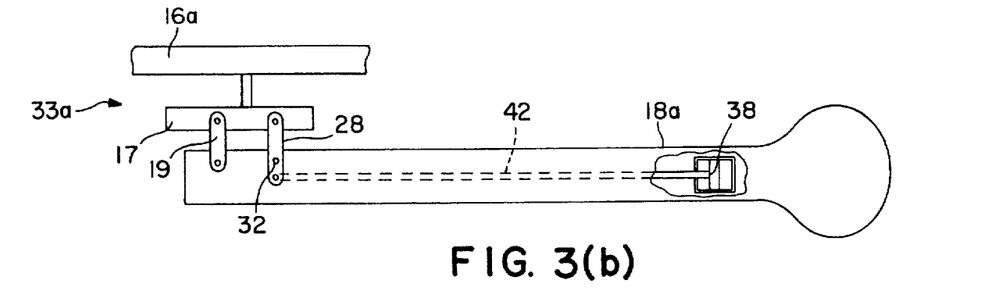
Figure 3C:
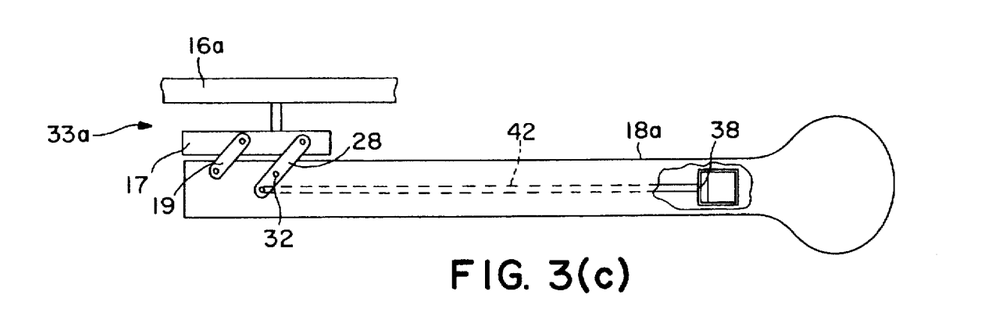

FIGS. 3(a), 3(b), and 3(c) show another aspect of the embodiment shown in FIG. 1, in that FIGS. 3(a), 3(b), and 3(c) show a wiper blade assembly 33a having both a wiper blade 16a and a wiper blade base 17, mounted in parallel to wiper blade 16a. Also, FIGS. 3(a), 3(b), and 3(c) show a stabilizer rod 19 which is pivotally connected to wiper arm 18a and wiper blade 16a and which moves pivotally in conjunction with link 28. These additional features shown in FIGS. 3(a), 3(b), and 3(c) are preferred in that stabilizer bar 19 helps to keep wiper blade 16a parallel to wiper arm 18a, which is important to distribute evenly the force necessary for properly wiping the windshield.

As shown in FIGS. 3(a), 3(b), and 3(c), an end of link 28 is connected to a drive rod 42, which is connected to piston 38. Link 28 is pivotally connected to wiper arm 18a at a pivot point 32. Link 28 is connected to wiper blade base 17 of wiper blade assembly 33a sensor at an end remote from the connection of link 28 to drive rod 42. The placement of pivot point 32 along link 28 is one way in which the relative distance over which wiper blade 16a moves from its extended position (as shown in FIG. 3(a)) to its retracted position (as shown in FIG. 3(c)) can be adjusted. More specifically, as pivot point 32 is moved closer to the end of link 28 which is connected to drive rod 42, wiper blade 16a will move a relatively greater distance upon movement of drive rod 42. Similarly, if pivot point 32 is moved closer to the end of link 28 which is attached to wiper blade base 17, wiper blade 16a will move a shorter linear distance upon movement of drive rod 42. The length of stabilizer rod 19 is the length of the portion of link 28 which extends from pivot point 32 to wiper blade base 17.

According to a preferred embodiment of the invention, valve assembly 31 is disposed between pressure fluid source 30 and a primary cylinder 50, which houses piston 38. Primary cylinder 50 has a near wall 51 closer to link 28 and a remote wall 52 further away from link 28. Thus, primary cylinder 50 defines a first pressure chamber 53 between piston 38 and near wall 51 and a second pressure chamber 54 between piston 38 and remote wall 52.

Several conduits are used to conduct pressure fluid between pressure fluid source 30, valve assembly 31 and primary cylinder 50. A first inlet conduit 43 extends between pressure fluid source 30 and a central portion of valve assembly 31. A second inlet conduit 47 extends between a first end portion of valve assembly 31 and first pressure chamber 53. A third inlet conduit 48 extends between a second end portion of valve assembly 31 and second pressure chamber 54. The main portion of valve assembly 31 is a secondary cylinder 34, disposed between first inlet conduit 43 and second inlet conduit 47 and third inlet conduit 48 for conducting fluid to and from primary cylinder 50. A first drain conduit 58 extends from the first end portion of secondary cylinder 34. A second drain conduit 59 extends from the second end portion of secondary cylinder 34. A first check valve 60 is disposed first drain conduit 58 and a second check valve 61 is disposed second drain conduit 59.

A push rod 44 extends through secondary cylinder 34. Windings 45a and 45b are mounted to push rod 44 and are movable in response to actuation of solenoids 36a and 36b, respectively. Mounted to push rod 44 are first and second baffles 46a and 46b, which direct the flow of pressure fluid within secondary cylinder 34 by inhibiting flow across each baffle. First baffle 46a is disposed near second inlet conduit 47 and defines a first inlet chamber in fluid communication with first drain conduit 58 and selectively in fluid communication with first pressure chamber 53 through second inlet conduit 47. Second baffle is disposed near third inlet conduit 48 and defines a second inlet chamber in fluid communication with second drain conduit 59 and selectively in fluid communication with second pressure chamber 54 through third inlet conduit 48. First and second baffles 46a and 46b define a third inlet chamber in fluid communication with first inlet conduit 43.

Before any pressure fluid is delivered to secondary cylinder 34 and while the wiper arm is in the hidden park position, drive rod 42 and push rod 44 are in the positions shown in FIGS. 2(a) and 3(c), with the wiper blade in the retracted position.

In operation, when the windshield wiper is switched on to the normal wiping mode (from the hidden park mode), wiper arms 18a and 18b and wiper blades 16a and 16b move from the hidden park position to the inwipe position. As wiper arm 18a moves from the hidden park position, sensor 40 recognizes this movement and emits a signal to control unit 41. In response, control unit 41 causes actuation of solenoid 36b, thereby causing movement of push rod 44 from the position shown in FIG. 2(a) to that shown in FIG. 2(b). In the position shown in FIG. 2(b), there is an uninhibited flow path between first inlet conduit 43 and second inlet conduit 47. Also, control unit 41 causes actuation of pressure fluid source 30 to deliver pressure fluid through first inlet conduit 43 to the third inlet chamber of secondary cylinder 34. Consequently, pressure fluid is directed to first pressure chamber 53. This drives piston 38 to the right as viewed in FIGS. 2(a), 2(b), 3(a), 3(b), and 3(c), thereby causing link 28 (and stabilizer rod 19) to rotate counterclockwise from the position in FIG. 3(c).

With such movement of piston 38, wiper blade 16a moves from its retracted position, as shown in FIG. 3(c), to an intermediate position as shown in FIG. 3(b), and finally to its extended position as shown in FIG. 3(a). As shown in FIG. 2(b), when wiper blade 16a is in its extended position, a moving contact element 63, which is coupled to drive rod 42, abuts against a stationary contact element 64, mounted on wiper arm 18a. A signal is then delivered from contact element 64 to control unit 41 which stops the delivery of pressure fluid from pressure fluid source 30 to first inlet conduit 43. Optionally, drive motor 24 may also be controlled by control unit 41, such that only after the delivery of pressure fluid from pressure fluid source 30 has ceased, control unit 41 then permits drive motor 24 to cause oscillation of wiper arms 18a and 18b.

When the wiper switch is turned off, sensor 40 recognizes movement of wiper arm 18a to a position between the inwipe position and the hidden park position. In response, control unit 41 causes actuation of solenoid 36a, thereby causing movement of push rod 44 from the position shown in FIG. 2(b) to that shown in FIG. 2(a). In the position shown in FIG. 2(a), there is an uninhibited flow path between first inlet conduit 43 and third inlet conduit 48. Also, control unit 41 causes actuation of pressure fluid source 30 to deliver pressure fluid through first inlet conduit 43 to the third inlet chamber of secondary cylinder 34.

Consequently, pressure fluid is directed to second pressure chamber 54. This drives piston 38 to the left as viewed in FIGS. 2(a), 2(b), 3(a), 3(b), and 3(c), thereby causing link 28 (and stabilizer rod 19) to rotate clockwise from the position in FIG. 3(a). As shown in FIGS. 3(a), 3(b), and 3(c), movement of drive rod 42 to the left causes wiper blade 16a to move from its extended position as shown in FIG. 3(a), to an intermediate position as shown in FIG. 3(b), and finally to a retracted position as shown in FIG. 3(c).

As shown in FIG. 2(a), when wiper blade 16a is in its retracted position, moving contact element 63 abuts against another stationary contact 65, which causes a signal to be sent to control unit 41. In response, control unit 41 stops the delivery of pressure fluid from pressure fluid source 30 to first inlet conduit 43. Optionally, drive motor 24 may also be controlled by control unit 41, such that only after the delivery of pressure fluid from pressure fluid source 30 has ceased, control unit 41 then permits drive motor 24 to drive wiper arms 18a and 18b to a position corresponding to the hidden park position of wiper blades 16a and 16b.

As shown in FIGS. 4, 5(a), 5(b), and 5(c), a second embodiment of the present invention achieves the pivotal movement of wiper blade 16a by using an electrical motor 70 responsive to a control unit 41 and an electrical power source 72, such as the vehicle battery. Control unit 41 responds to a sensor 40 and is positioned between the electrical power source 72 and motor 70 to selectively open and close an electrical connection between electrical power source 72 and motor 70.

Figure 4:
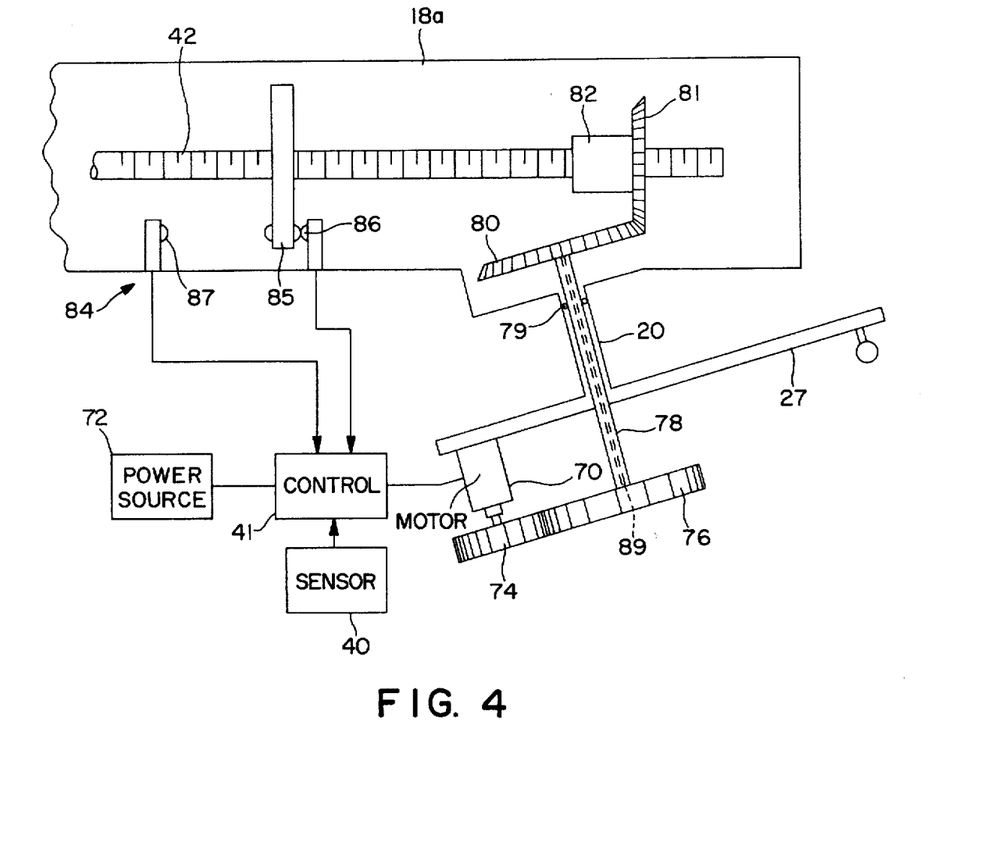
FIG. 4 is a schematic view showing a wiper system in accordance with a second embodiment of the present invention.

In this embodiment, the device for driving wiper arms 18a and 18b in an oscillating movement includes wiper motor 24 and a drive arm 27, which is movable in response to wiper motor 24 and coupled to an end of wiper post 20 remote from wiper arm 18a. In this embodiment, wiper post 20 is tubular. A housing (not shown) may surround wiper post 20 and may include a mount adapted for mounting the wiper system to an automotive vehicle part, such as sheet metal part 22 as shown in FIG. 1. Motor 70 is preferably mounted on drive arm 27.

A gear assembly may be used to translate the rotational motion of motor 70 to pivotal movement of link 28. In the embodiment of the invention illustrated in FIG. 4, a drive gear 74 is coaxially mounted with (i.e., sharing a central axle and rotatable with) motor 70. A driven gear 76 is engaged with and rotates in response to rotation of drive gear 74. Coaxially mounted with driven gear 76 is a drive shaft 78 which extends through wiper post 20. Bearings 79 permit the relative rotation between drive shaft 78 and wiper post 20. Drive shaft 78 may include a longitudinally extending passage 89 for accommodating a windshield washer hose (not shown).

The end of drive shaft 78 remote from driven gear 76 extends into the interior of wiper arm 18a. Mounted coaxially to this end of drive shaft 78 is a first bevel gear 80 within wiper arm 18a. A second bevel gear 81 is mounted to engage first bevel gear 80 at an approximate 90° angle and rotates in response to rotation of first bevel gear 80. A drive rod 42, connected at one end to link 28 and in engagement with a gearing element 82 which is attached to bevel gear 81, moves through the center of bevel gear 81 upon rotation of bevel gear 81 through the engagement of the drive rod with the gearing element. Gearing element 82 can be, for example, a helical gear which engages a mating helical gear affixed to drive rod 42.

A sensor 40, which senses the position of wiper arm 18a, emits a signal to control unit 41 in order to control motor 70. Sensor 40 may be any known sensor which can detect the position of wiper arm 18a, such as a magnetic sensor and/or a probe on the wiper arm. Alternatively, an electrical sensor may be used in the switch which turns wiper motor 24 on and off. Sensor 40 will detect the position of wiper arm 18a and will actuate motor 70 by way of control unit 41 whenever wiper arm 18a is being moved into or out of the hidden park position.

Figure 5A:
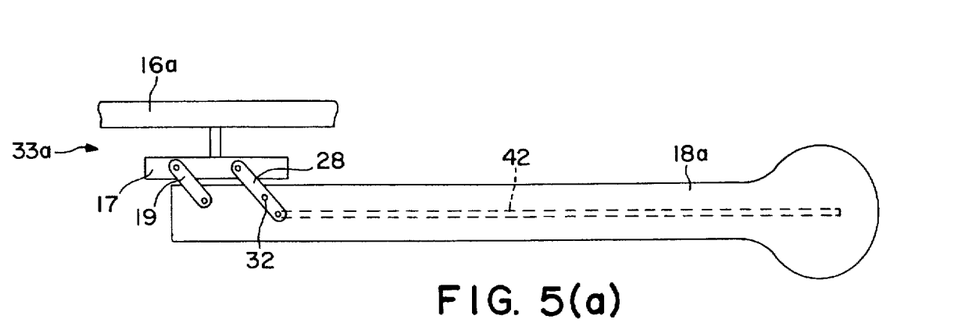
FIGS. 5(a), 5(b), and 5(c) are top plan views of a wiper arm and wiper blade in accordance with the embodiment shown in FIG. 4, with the wiper blade in its extended, intermediate, and retracted positions, respectively.
Figure 5B:
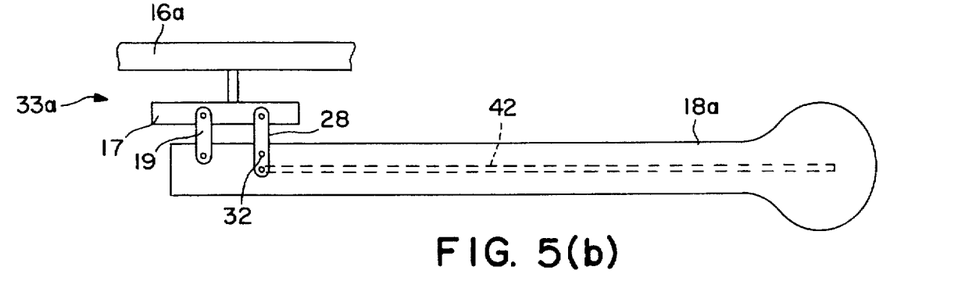
Figure 5C:
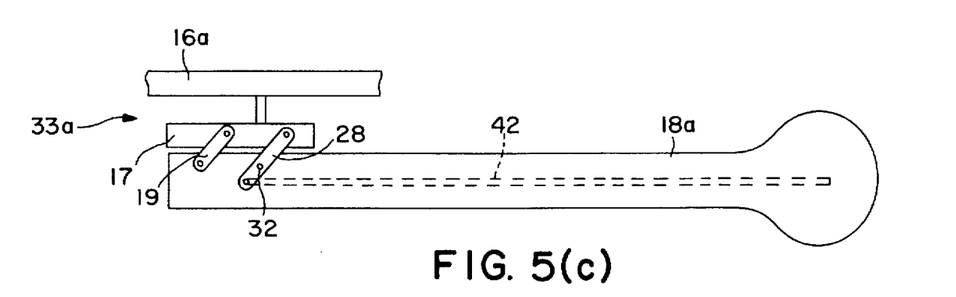

FIGS. 5(a), 5(b), and 5(c) show another aspect of the embodiment shown in FIG. 1, in that FIGS. 5(a), 5(b), and 5(c) show a wiper blade assembly 33a having both a wiper blade 16a and a wiper blade base 17, mounted in parallel to wiper blade 16a. Also, FIGS. 5(a), 5(b), and 5(c) show a stabilizer rod 19 which is pivotally connected to wiper arm 18a and wiper blade 16a and which moves pivotally in conjunction with link 28. These additional features shown in 5(a), 5(b), and 5(c) are preferred in that stabilizer bar 19 helps to keep wiper blade 16a parallel to wiper arm 18a, which is important to distribute evenly the force necessary for properly wiping the windshield.

As shown in FIGS. 5(a), 5(b), and 5(c), drive rod 42 is connected to an end of link 28. Link 28 is pivotally connected to wiper arm 18a at a pivot point 32. Link 28 is connected to wiper blade base 17 of wiper blade assembly 33a at an end remote from the connection of link 28 to drive rod 42. As in the first embodiment, the placement of pivot point 32 along link 28 can be used to alter the relative distance which wiper blade 16a moves upon movement of drive rod 42.

A switch 84 having a first contact element 85 mounted on and movable with drive rod 42, a second contact element 86 mounted to wiper arm 18a, and a third contact element 87 mounted to wiper arm 18a at a point closer to link 28 than second contact element 86, serves to control oscillation of drive arm 27. Upon abutment of first contact element 85 against second contact element 86, switch 84 emits a signal to control unit 41. In response, control unit 41 closes the electrical connection between motor 70 and electrical power source 72 and permits the commencement of the oscillation of drive arm 27 by wiper motor 24. Upon abutment of first contact element 85 against third contact element 87, switch 84 emits another signal to control unit 41. In response to this signal, control unit 41 closes the electrical connection between motor 70 and electrical power source 72 and permits movement of drive arm 27 to a position corresponding to the hidden park position of wiper blade 16a.

In operation, when the windshield wiper is switched on to the normal wiping mode (from the hidden park mode), wiper arms 18a and 18b and wiper blades 16a and 16b move from the hidden park position to the inwipe position. As wiper arm 18a moves from the hidden park position, sensor 40 recognizes this movement and causes actuation of motor 70 through control unit 41. The rotational movement imparted to drive gear 74 is translated to linear movement of drive rod 42 through driven gear 76, drive shaft 78, first bevel gear 80, second bevel gear 81, and gearing element 82. This causes drive rod to move to the right as shown in FIGS. 4 and 5(a), 5(b), and 5(c), thereby causing link 28 to rotate counterclockwise as viewed in FIG. 5(c). With further movement of drive rod 42, wiper blade 16a moves from its retracted position, as shown in FIG. 5(c), to an intermediate position as shown in FIG. 5(b), and finally to its extended position as shown in FIGS. 4 and 5(a).

When wiper blade 16a has reached its extended position, contact element 85, which is coupled to drive rod 42, abuts against contact element 86, as shown in FIG. 4. As described above, a signal is delivered to control unit 41 which then turns off motor 70. Then, control unit 41 permits drive motor 24 to cause oscillation of wiper arms 18a and 18b.

When the wiper switch is turned off, sensor 40 recognizes movement of wiper arm 18a to a position between the inwipe position and the hidden park position and emits a signal. In response to this signal from sensor 40, control unit 41 actuates motor 70 which, as described above, causes linear movement of drive rod 42 to the left as shown in FIGS. 4 and 5(a), 5(b), and 5(c). Movement of drive rod 42 to the left causes wiper blade 16a to move from its extended position as shown in FIGS. 4 and 5(a), to an intermediate position as shown in FIG. 5(b), and finally to a retracted position as shown in FIG. 5(c).

When wiper blade 16a is in its retracted position, moving contact element 85 abuts against stationary contact 87, which causes a signal to be sent to control unit 41. Control unit 41 then turns off motor 70. Then, control unit 41 sends a signal to wiper motor 24 to move drive arm 27 to a position corresponding to the hidden park position of wiper blades 16a and 16b.

Although the invention is illustrated and described herein with reference to certain specific embodiments, the claims are not intended to be limited to the details shown. Rather, the claims should be read to include various modifications of the details shown without departing from the spirit of the invention. For example, the embodiments described above refer to the use of the invention for the wiper for the passenger's side (i.e., right) windshield wiper. Nonetheless, the system of the present invention could also be used to extend and retract a wiper blade for a driver's side (i.e., left) windshield wiper or a rear window windshield wiper.

What is claimed:

1. A windshield wiper system comprising:

a wiper post;

an elongated wiper arm having a first end mounted to said wiper post for oscillatory movement;

an elongated wiper blade assembly;

an elongated link pivotally attached at a first end to said wiper blade assembly and pivotally mounted to said wiper arm remote from said first end of said wiper arm for:
   (a) pivotal movement relative to said wiper arm in a first direction to extend the blade assembly along said wiper arm; and
   (b) pivotal movement relative to said wiper arm in a second direction opposite to the first pivotal movement direction to retract the blade assembly along said wiper arm;

drive means for imparting oscillatory movement to said wiper arm;

a power source;

a driver;

means for connecting said driver to said link;

means for sensing the position of said wiper arm; and means responsive to said sensing means for selectively connecting said power source to said driver to move said driver in a:
   (a) first direction to impart to said link relative pivotal movement between said link and said wiper arm in the first pivotal movement direction as said wiper arm passes through a predetermined position in oscillatory movement of said wiper arm in a first oscillatory movement direction, and
   (b) second direction to impart to said link relative pivotal movement between said link and said wiper arm in the second pivotal movement direction as said wiper arm passes through said predetermined position in oscillatory movement of said wiper arm in a second oscillatory movement direction opposite to the first oscillatory movement direction.

2. A windshield wiper system in accordance with claim 1 wherein:

said power source is a pressure fluid source;

said driver is a piston; and said selective connecting means include:
   (a) a valve assembly between said fluid source and said piston,
   (b) a solenoid for actuating said valve assembly to control fluid flow between said piston and said fluid source, and
   (c) a control unit responsive to said sensing means for controlling said solenoid and said fluid source.

3. A windshield wiper system in accordance with claim 2 wherein:

said means for connecting said driver to said link include a drive rod extending along said wiper arm and connected to said piston and said link; and said link is connected to said drive rod at a second end of said link and has a pivot point, between said first end and said second end of said link, at which pivot point said link is pivotally connected to said wiper arm.

4. A windshield wiper system in accordance with claim 3 wherein:

said wiper blade assembly includes a wiper blade and a wiper blade base, mounted in parallel to said wiper blade;

said link is pivotally connected to said wiper blade base at the first end of said link; and said windshield wiper system further comprises a stabilizer rod pivotally connected to said wiper arm and said wiper blade base for pivotal movement in conjunction with said link.

5. A windshield wiper system in accordance with claim 3 wherein said selective connecting means further include:

a primary cylinder in which said piston is disposed and having a near wall closer to said link through which said drive rod extends and having a remote wall and defining:
   (a) a first pressure chamber between said piston and said near wall, and
   (b) a second pressure chamber between said piston and said remote wall; and a first inlet conduit extending between said fluid source and a central portion of said valve assembly;

a second inlet conduit extending between a first end portion of said valve assembly and said first pressure chamber;

a third inlet conduit extending between a second end portion of said valve assembly and said second pressure chamber;

and wherein said valve assembly comprises:

an elongated secondary cylinder, disposed between said first inlet conduit and said second and third inlet conduits, for conducting fluid to and from said primary cylinder, ends of said secondary cylinder define said first and second end portion;

a push rod extending through said secondary cylinder and actuatable by said solenoid;

a first drain conduit extending from said first end portion of said secondary cylinder;

a second drain conduit extending from said second end portion of said secondary cylinder; and first and second baffles mounted to said push rod, wherein:
   (a) said first baffle is disposed near said second inlet conduit and defines a first inlet chamber in fluid communication with said first drain conduit and selectively in fluid communication with said first pressure chamber through said second inlet conduit,
   (b) said second baffle is disposed near said third inlet conduit and defines a second inlet chamber in fluid communication with said second drain conduit and selectively in fluid communication with said second pressure chamber through said third inlet conduit,
   (c) said first and second baffles define a third inlet chamber in fluid communication with said first inlet conduit.

6. A windshield wiper system in accordance with claim 1 wherein:

said power source is an electrical source;

said driver is an electrical motor; and said selective connecting means include control means responsive to said sensing means and positioned between said electrical source and said motor to selectively open and close an electrical connection between said motor and said electrical source.

7. A windshield wiper system in accordance with claim 6 wherein:

said wiper post is tubular;

said drive means include:

(a) a wiper motor, and (b) a drive arm movable in response to said wiper motor and coupled to an end of said wiper post remote from said wiper arm;

said driver is mounted on said drive arm; and said means for connecting said driver to said link include:

(a) a drive gear which rotates in response to said driver, (b) a driven gear engaged with and rotated by said drive gear;

(c) a drive shaft extending through said wiper post and having a first end connected to said driven gear and rotatable with said driven gear;

(d) a first bevel gear mounted to a second end of said drive shaft;

(e) a second bevel gear rotated by said first bevel gear;

(f) a drive rod coupled at one end to said link and movable through said second bevel gear; and (g) means for translating rotational motion of said second bevel gear to linear movement of said drive rod.

8. A windshield wiper system in accordance with claim 7 wherein said link is connected to said drive rod at a second end of said link and has a pivot point, between said first end and said second end of said link, at which pivot point said link is pivotally connected to said wiper arm.

9. A windshield wiper system in accordance with claim 8 wherein:

said wiper blade assembly includes a wiper blade and a wiper blade base, mounted in parallel to said wiper blade;

said link is pivotally connected to said wiper blade base at the first end of said link; and said windshield wiper system further comprises a stabilizer rod pivotally connected to said wiper arm and said wiper blade base for pivotal movement in conjunction with said link.

10. A windshield wiper system in accordance with claim 7 wherein said drive shaft is tubular.

11. A windshield wiper system in accordance with claim 6, further comprising a switch having:

(a) a first contact element mounted on and movable with said drive rod, (b) a second contact element mounted to said wiper arm, and (c) a third contact element mounted to said wiper arm at a point closer to said link than said second contact element; and wherein said control means respond to said first, second and third contact elements for:

(a) upon abutment of said first contact element against said second contact element, closing the electrical connection between said driver and said electrical source and permitting the commencement of the oscillation of said drive arm by said wiper motor, and (b) upon abutment of said first contact element against said third contact element, closing the electrical connection between said driver and said electrical source and permitting movement of said drive arm to a position corresponding to the hidden park position of said wiper blade.

* * * * *

UNITED STATES PATENT AND TRADEMARK OFFICE
CERTIFICATE OF CORRECTION

PATENT NO. : 5,502,865
DATED : April 2, 1996
INVENTOR(S) : Peter Zhou et al.

It is certified that error appears in the above-indentified patent and that said Letters Patent is hereby corrected as shown below:

On the Title page, please insert item --[73]

Assignee: ITT Automotive Electrical Systems, Inc.
Auburn Hills, Michigan--

Signed and Sealed this

Twenty-first Day of January, 1997

*Attest:*

BRUCE LEHMAN

*Attesting Officer*          *Commissioner of Patents and Trademarks*